(12) United States Patent
Demitraszek, Sr. et al.

(10) Patent No.: US 9,234,439 B2
(45) Date of Patent: Jan. 12, 2016

(54) GAS TURBINE ENGINE WITH BEARING COMPARTMENT WALL COOLING

(71) Applicant: United Technologies Corporation, Hartford, CT (US)

(72) Inventors: Anthony Demitraszek, Sr., Coventry, CT (US); Woo Y. Soh, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 577 days.

(21) Appl. No.: 13/665,984

(22) Filed: Nov. 1, 2012

(65) Prior Publication Data

US 2014/0119913 A1 May 1, 2014

(51) Int. Cl.
F01D 25/16 (2006.01)
F16C 37/00 (2006.01)
F01D 25/18 (2006.01)
F01D 25/12 (2006.01)

(52) U.S. Cl.
CPC .............. *F01D 25/16* (2013.01); *F01D 25/125* (2013.01); *F01D 25/18* (2013.01); *F16C 37/007* (2013.01); *Y02T 50/671* (2013.01); *Y02T 50/675* (2013.01)

(58) Field of Classification Search
None
See application file for complete search history.

(56) References Cited

U.S. PATENT DOCUMENTS

| | | | |
|---|---|---|---|
| 2,356,578 A * | 8/1944 | Galtney | F16C 37/007 384/476 |
| 4,561,246 A | 12/1985 | Hovan | |
| 4,574,584 A | 3/1986 | Hovan | |
| 4,968,158 A | 11/1990 | Atkinson et al. | |
| 6,516,618 B1 | 2/2003 | Bock | |
| 6,582,187 B1 | 6/2003 | Shockley et al. | |
| 6,684,942 B2 * | 2/2004 | Song et al. | 165/122 |
| 6,910,863 B2 * | 6/2005 | Scardicchio et al. | 416/1 |
| 7,625,126 B2 | 12/2009 | Peters et al. | |
| 7,743,600 B2 | 6/2010 | Babu et al. | |
| 7,836,675 B2 * | 11/2010 | Corattiyil et al. | 60/39.08 |
| 7,955,046 B2 | 6/2011 | McCune et al. | |
| 8,192,151 B2 | 6/2012 | Ballard | |
| 8,210,316 B2 | 7/2012 | DiBenedetto et al. | |
| 8,984,858 B2 * | 3/2015 | Miller | 60/39.83 |
| 2004/0115041 A1 | 6/2004 | Scardicchio et al. | |
| 2006/0037302 A1 | 2/2006 | Peters et al. | |
| 2007/0157596 A1 | 7/2007 | Moniz | |
| 2009/0101087 A1 | 4/2009 | Ueno et al. | |
| 2010/0027926 A1 | 2/2010 | Fang et al. | |

OTHER PUBLICATIONS

International Search Report and Written Opinion for International Application No. PCT/US2013/067164 completed on Feb. 18, 2014.
International Preliminary Report on Patentability for International Application No. PCT/US2013/067164 mailed May 14, 2015.

\* cited by examiner

*Primary Examiner* — Dwayne J White
*Assistant Examiner* — Justin Seabe
(74) *Attorney, Agent, or Firm* — Carlson, Gaskey & Olds, PC

(57) ABSTRACT

A bearing compartment for a gas turbine engine comprises a housing that surrounds an engine axis of rotation and has an inner surface and an outer surface spaced radially outward of the inner surface. The housing defines an open volume for a lubricant and includes a bearing seat to seat a bearing for rotation about the engine axis of rotation. The housing includes at least one cooling protuberance extending into the open volume.

19 Claims, 2 Drawing Sheets

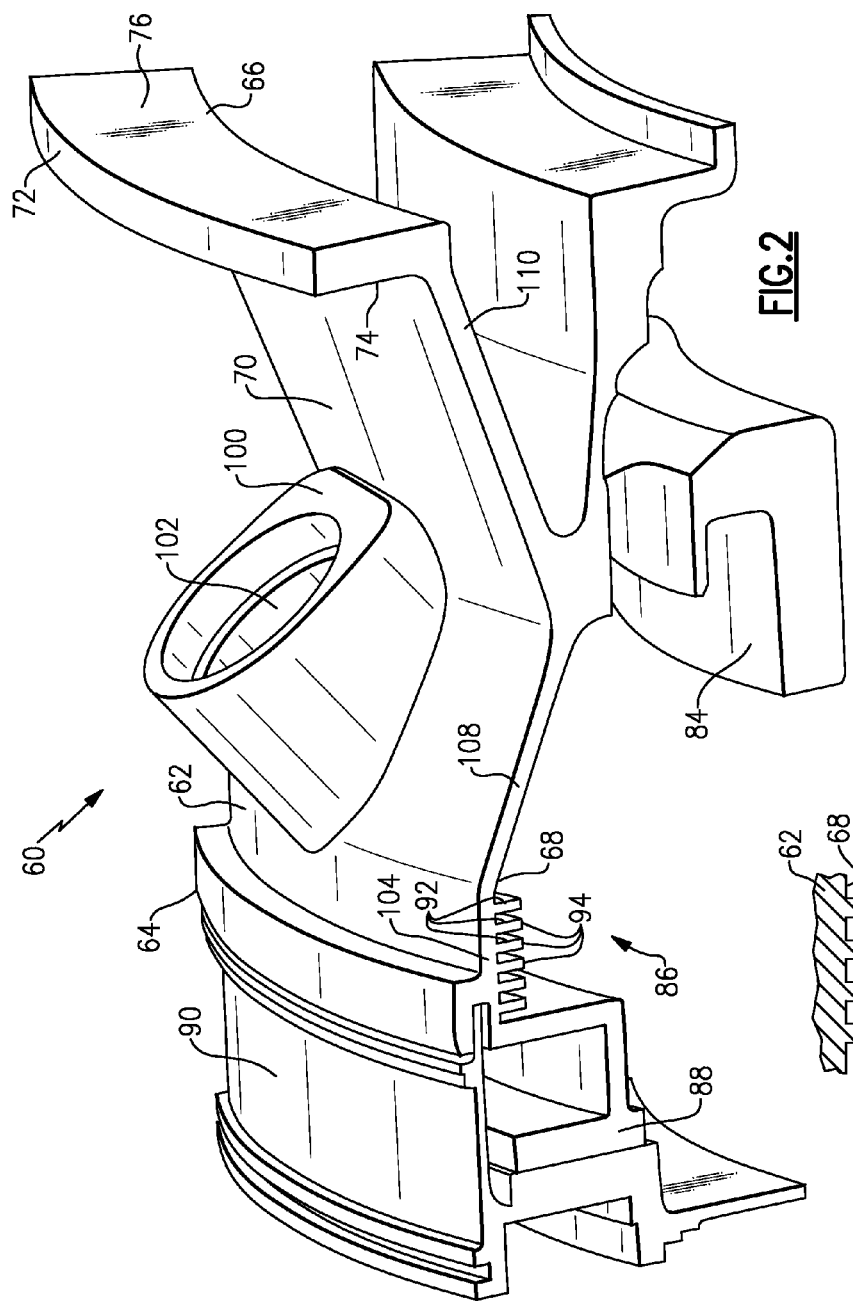
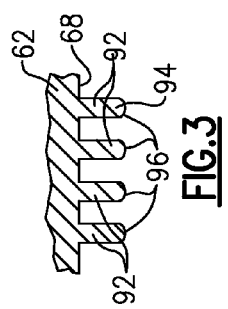
FIG.2
FIG.3

GAS TURBINE ENGINE WITH BEARING COMPARTMENT WALL COOLING

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A low speed spool generally includes an inner shaft that connects the fan section and a low pressure compressor section to a low pressure turbine section. A high-speed spool includes an outer shaft that interconnects a high pressure compressor section and a high pressure turbine section. The low speed spool and the high speed spool are mounted for rotation about an engine central axis relative to an engine static structure via several bearing systems.

Bearings are mounted within bearing compartments that are sized to contain an adequate amount of lubricant such that the bearings operate efficiently. It is important to maintain proper lubrication so that the bearings do not overheat. Bearing compartment volumes have decreased as overall engine sizes have become smaller in an attempt to reduce weight while still providing the desired power output. As such, providing sufficient cooling for the bearing systems has become even more challenging.

SUMMARY

In a featured embodiment, a bearing compartment for a gas turbine engine has a housing surrounding an engine axis of rotation, and an inner surface and an outer surface spaced radially outward of the inner surface. The housing defines an open volume for a lubricant, and includes a seat for a bearing for rotation about the engine axis of rotation. The housing includes at least one cooling protuberance extending into the open volume.

In another embodiment according to the previous embodiment, the at least one cooling protuberance has a plurality of cooling protuberances.

In another embodiment according to any of the previous embodiments, the inner surface has a wetted surface. The cooling protuberances extend from the wetted surface into the lubricant with each cooling protuberance being spaced apart from an adjacent cooling protuberance by a gap.

In another embodiment according to any of the previous embodiments, the cooling protuberances have a plurality of fins.

In another embodiment according to any of the previous embodiments, the housing extends from a first end to a second end. One of the first and second ends includes an attachment flange configured for attachment to a non-rotating engine case structure.

In another embodiment according to any of the previous embodiments, each cooling protuberance extends to a distal end that is spaced from the inner surface of the housing.

In another featured embodiment, a gas turbine engine has a non-rotating engine structure. A first shaft rotates about an engine axis relative to the non-rotating engine structure. A first compressor is connected to the first shaft. A first turbine is connected to the first shaft. At least one bearing system supports the first shaft for rotation relative to the non-rotating engine structure, the at least one bearing system including a bearing compartment having a housing surrounding the engine axis. The housing has an inner surface and an outer surface spaced radially outward of the inner surface. The housing defines an open volume for a lubricant. The housing includes a seat for a bearing for rotation about the engine axis. The housing includes at least one cooling protuberance extending into the open volume.

In another embodiment according to the previous embodiment, the bearing includes an inner race mounted for rotation with the first shaft and an outer race seated on the bearing seat.

In another embodiment according to any of the previous embodiments, the at least one cooling protuberance has a plurality of cooling protuberances.

In another embodiment according to any of the previous embodiments, the inner surface of the housing comprises a wetted surface. The cooling protuberances extend from the wetted surface into the lubricant with each cooling protuberance spaced apart from an adjacent cooling protuberance by a gap.

In another embodiment according to any of the previous embodiments, the cooling protuberances have a plurality of fins.

In another embodiment according to any of the previous embodiments, the housing extends from a first end to a second end. One of the first and second ends includes an attachment flange configured for attachment to a non-rotating engine structure.

In another embodiment according to any of the previous embodiments, each cooling protuberance extends to a distal tip that has a rounded surface.

In another embodiment according to any of the previous embodiments, the housing comprises a single-piece cast component.

In another embodiment according to any of the previous embodiments, the gas turbine engine includes a second shaft. A second compressor is connected to the second shaft, and a second turbine is connected to the second shaft.

In another embodiment according to any of the previous embodiments, the first compressor has a low pressure compressor and the first turbine has a low pressure turbine. The second compressor has a high pressure compressor and the second turbine has a high pressure turbine.

In another embodiment according to any of the previous embodiments, the gas turbine engine includes a fan driven by the first shaft.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a view of a portion of a bearing compartment for a bearing system as shown in FIG. 1.

FIG. 3 is a schematic representation of an alternate cooling protuberance embodiment.

DETAILED DESCRIPTION

Figure 1:
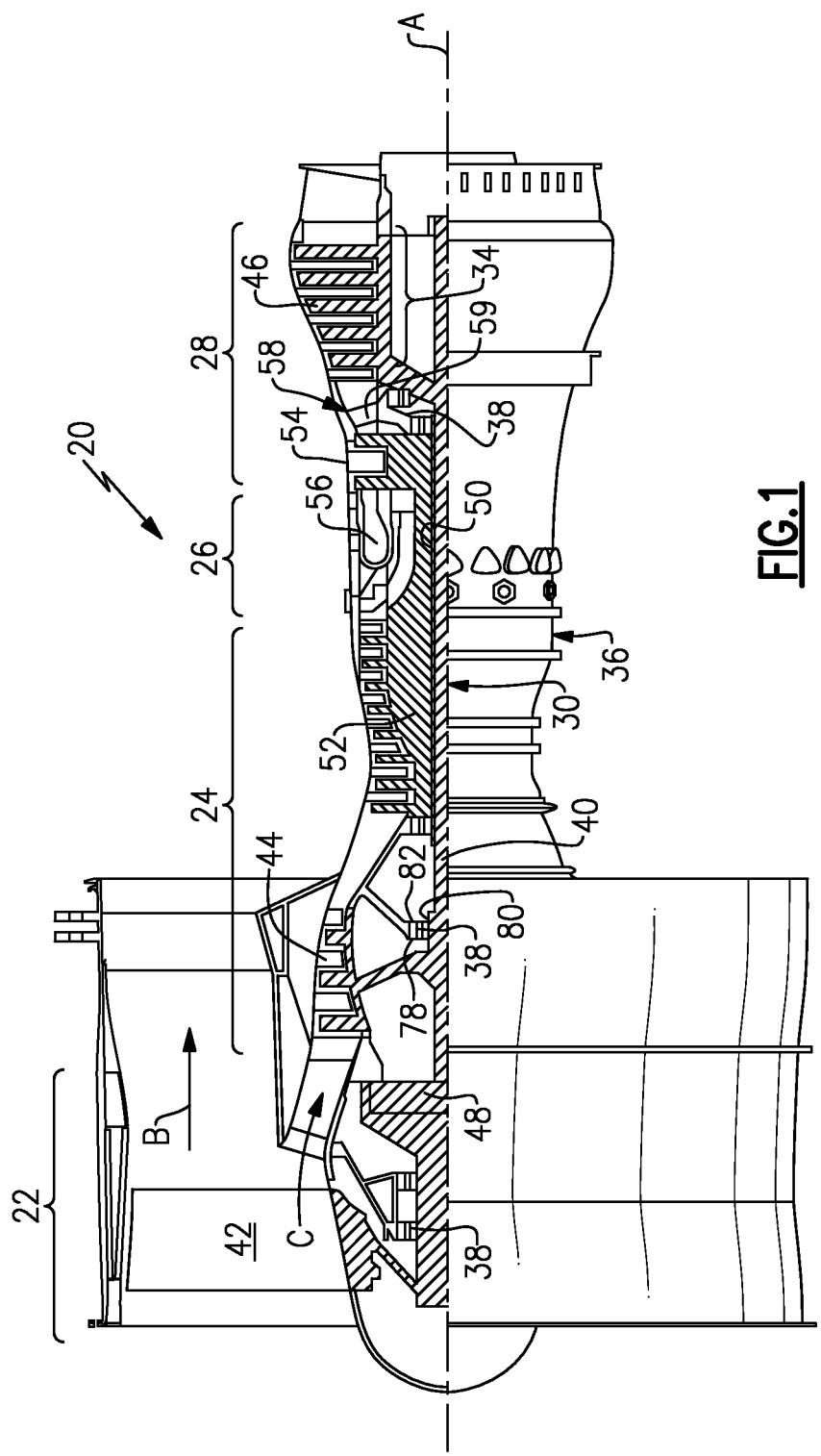
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5, The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 59, which are in the core airflow path and function as an inlet guide vane for the low pressure turbine 46. Utilizing the vane 59 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50, In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6, The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

FIG. 2 shows a bearing compartment 60 that can be utilized for any of the various bearing systems 38 within the gas turbine engine 20. The bearing compartment 60 includes a housing 62 having first end 64 and a second end 66 axially spaced from the first end 64. The housing 62 defines an inner surface 68 and an outer surface 70 that is spaced radially outward of the inner surface 68. FIG. 2 only shows one circumferential portion of the bearing compartment 60. It should be understood that the compartment 60 would extend circumferentially about the axis A to surround the rotating shafts 40, 50 and associated bearings.

The second end 66 includes a case attachment flange 72 that is fixed to a non-rotating engine static structure 36 (FIG. 1). The case attachment flange 72 extends radially outward from the second end 66 to provide a fore attachment face 74 and an aft attachment face 76 that can be configured to receive fasteners to attach the flange 72 to a corresponding flange within the static engine structure.

Each bearing system 38 includes at least one bearing 78 (FIG. 1) having an inner race 80 mounted for rotation with one of the first or second rotating shafts 40, 50 and an outer race 82 that is seated within the housing 62. The bearing 78 can comprise any type of bearing such as, for example, a roller bearing, thrust bearing, ball bearing, tapered roller bearing, etc.

The housing 62 includes at least one bearing seat 84 that seats the outer race 82 of the bearing 78. When the case attachment flange 72 is attached to the static structure 36 and when the bearing 78 is seated between one of the shafts 40, 50 and the bearing seat 84, an open bearing compartment volume 86 is defined between the inner surface 68 of the housing 62 and the shafts 40, 50. This open area receives lubricating fluid for the bearings 78. As known, seals (not shown) are positioned at the first 64 and second 66 ends to seal the bearing compartment volume 86.

The first end 64 includes an attachment flange 88 that is fixed to a non-rotating structure 90 associated with the static structure 36. The non-rotating structure 90 can provide support for the seals or can provide additional rigid support for the housing 62 as needed.

The housing 62 includes one or more extended surfaces or protuberances 92 that are spaced apart from each other and extend outwardly into the bearing compartment volume 86. Some examples of protuberances 92 include fins, pimples, fingers, etc. In one example, the protuberances 92 extend radially inwardly from the inner surface 68 of the housing 62 and toward the axis A. The inner surface 68 comprises a wetted surface. In one example, the protuberances 92 extend from the wetted surface into the lubricant. The protuberances 92 extend from one end at the housing 62 to a distal end 94. The distal ends 94 are axially spaced apart from each other to provide cooling gaps between the protuberances 92. The lengths of the protuberances 92 and the spacing of the protuberances 92 can be configured as needed to provide the desired cooling effect. Further, the location of the protuberances 92 shown in FIG. 2 is just one example, and it should be understood that the protuberances 92 could be formed at various locations within the bearing compartment 60.

In one example, the distal ends 94 of the protuberances 92 provide a rounded surface 96 as shown in FIG. 3. The rounded surface 96 provides the advantage of stress concentration reduction.

In one example, the housing 62 includes a probe boss 100 that is configured to receive a temperature probe (not shown). The temperature probe is inserted through the boss to monitor temperature of the lubricant. The boss 100 extends outwardly from the outer surface 70 of the housing 62 and defines an opening 102 through which the probe can be inserted.

The inner surface 68 includes an axial portion 104 that supports the protuberances 92. In one example, this axial portion 104 is defined by a generally constant diameter. The inner surface 68 tapers inwardly in an aft direction from an aft end of the axial portion 104 to form an inward inclined portion 108. In one example, the boss 100 is formed in this inward inclined portion 108. The inner surface 68 tapers outwardly in an aft direction from an aft end of the inward inclined portion 108 to form an outward inclined portion 110. The case attachment flange 72 is formed at the aft end of the outward inclined portion 110.

The bearing seat 84 is positioned radially inwardly of the inclined portions 108, 110. In one example, the bearing seat 84 is substantially positioned radially inwardly of the outward inclined portion 110.

In one example, the housing 62 is comprised as a single-piece cast component. In one example, the protuberances 92 are cast in their final form as part of the housing casting. Or, in another example, the housing could be cast with a subsequent machining of the protuberances. In another example, the housing could comprise a forged housing. Optionally, the housing could be brazed or welded to the inside of the compartment after the main structure is formed.

As the volume of bearing compartments is reduced, the thermal management of the bearing compartments becomes more difficult and can be a limiting factor in engine design. Lubricant wetted walls of the bearing compartment should be kept below certain temperatures to prevent coking. To improve cooling in reduced volumes, the protuberances are utilized to increase the surface area exposed to the relatively cool lubricant, which results in reduced wall temperatures for the bearing compartment 60 as compared to walls without protuberances.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A bearing compartment for a gas turbine engine comprising:
   a housing surrounding an engine axis of rotation and having an inner surface and an outer surface spaced radially outward of the inner surface, the housing defining an open volume for a lubricant, and wherein the housing includes a seat for a bearing for rotation about the engine axis of rotation, and wherein the housing includes a plurality of cooling protuberances extending into the open volume, and wherein the inner surface comprises a wetted surface, and wherein the cooling protuberances extend radially inward from the wetted surface into the lubricant with each cooling protuberance being spaced apart from an adjacent cooling protuberance by a gap; and
   wherein the housing extends from a fore end to an aft end, and wherein the aft end includes an attachment flange configured for attachment to a non-rotating engine structure, and wherein the inner surface of the housing includes an axial portion, and wherein the inner surface tapers inwardly in an aft direction from an aft end of the axial portion to form an inward inclined portion, and wherein the protuberances are formed on at least the axial portion.

2. The bearing compartment according to claim 1 wherein the cooling protuberances comprise a plurality of fins.

3. The bearing compartment according to claim 1 wherein each cooling protuberance extends to a distal end that is spaced from the inner surface of the housing.

4. The bearing compartment according to claim 1 wherein the housing includes a probe boss extending outward from the outer surface of the housing, the probe boss defining an opening configured to receive a probe.

5. The bearing compartment according to claim 1 wherein the inner surface tapers outwardly in an aft direction from an aft end of the inward inclined portion to form an outward inclined portion, and wherein the case attachment flange is formed at the aft end of the outward inclined portion.

6. The bearing compartment according to claim 5 wherein a probe boss is formed in the inward inclined portion, the probe boss defining an opening configured to receive a probe.

7. The bearing compartment according to claim 5 wherein the seat for the bearing is positioned radially inwardly of the outward inclined portion.

8. A gas turbine engine comprising:
a non-rotating engine structure;
a first shaft rotating about an engine axis relative to the non-rotating engine structure;
a first compressor connected to the first shaft;
a first turbine connected to the first shaft; and
at least one bearing system supporting the first shaft for rotation relative to the non-rotating engine structure, the at least one bearing system including a bearing compartment comprising a housing surrounding the engine axis, and wherein the housing has an inner surface and an outer surface spaced radially outward of the inner surface, the housing defining an open volume for a lubricant, and wherein the housing includes a seat for a bearing for rotation about the engine axis, and wherein the housing includes a plurality of cooling protuberances extending into the open volume, and wherein the inner surface comprises a wetted surface, and wherein the cooling protuberances extend radially inward from the wetted surface into the lubricant with each cooling protuberance being spaced apart from an adjacent cooling protuberance by a gap, and wherein the housing extends from a fore end to an aft end, and wherein the aft end includes an attachment flange configured for attachment to a non-rotating engine structure, and wherein the inner surface of the housing includes an axial portion, and wherein the inner surface tapers inwardly in an aft direction from an aft end of the axial portion to form an inward inclined portion, and wherein the protuberances are formed on at least the axial portion.

9. The gas turbine engine according to claim 8 wherein the bearing includes an inner race mounted for rotation with the first shaft and an outer race seated on the bearing seat.

10. The gas turbine engine according to claim 8 wherein the cooling protuberances comprise a plurality of fins.

11. The gas turbine engine according to claim 8 wherein each cooling protuberance extends to a distal tip that has a rounded surface.

12. The gas turbine engine according to claim 8 wherein the housing comprises a single-piece cast component.

13. The gas turbine engine according to claim 8 including a second shaft, a second compressor connected to the second shaft, and a second turbine connected to the second shaft.

14. The gas turbine engine according to claim 13 wherein the first compressor comprises a low pressure compressor and the first turbine comprises a low pressure turbine, and wherein the second compressor comprises a high pressure compressor and the second turbine comprises a high pressure turbine.

15. The gas turbine engine according to claim 14 including a fan driven by the first shaft.

16. The gas turbine engine according to claim 8 wherein the housing includes a probe boss extending outward from the outer surface of the housing, the probe boss defining an opening configured to receive a probe.

17. The gas turbine engine according to claim 8 wherein the inner surface tapers outwardly in an aft direction from an aft end of the inward inclined portion to form an outward inclined portion, and wherein the case attachment flange is formed at the aft end of the outward inclined portion.

18. The gas turbine engine according to claim 17 wherein a probe boss is formed in the inward inclined portion, the probe boss defining an opening configured to receive a probe.

19. The gas turbine engine according to claim 17 wherein the seat for the bearing is positioned radially inwardly of the outward inclined portion.

\* \* \* \* \*